(12) United States Patent
Takeuchi et al.

(10) Patent No.: US 12,725,535 B2
(45) Date of Patent: Sep. 1, 2026

(54) ASSEMBLED ABDOMINAL CAVITY SIMULATOR

(71) Applicant: Sunarrow Ltd, Tokyo (JP)

(72) Inventors: Junichi Takeuchi, Chiba (JP); Takeshi Anraku, Chiba (JP)

(73) Assignee: Sunarrow Ltd, Tokyo (JP)

( * ) Notice: Subject to any disclaimer, the term of this patent is extended or adjusted under 35 U.S.C. 154(b) by 921 days.

(21) Appl. No.: 17/771,256

(22) PCT Filed: Jan. 3, 2020

(86) PCT No.: PCT/JP2020/000004
§ 371 (c)(1),
(2) Date: Apr. 22, 2022

(87) PCT Pub. No.: WO2021/137272
PCT Pub. Date: Jul. 8, 2021

(65) Prior Publication Data

US 2022/0375368 A1 Nov. 24, 2022

(51) Int. Cl.
*G09B 23/28* (2006.01)

(52) U.S. Cl.
CPC .................................. *G09B 23/285* (2013.01)

(58) Field of Classification Search
None
See application file for complete search history.

(56) References Cited

U.S. PATENT DOCUMENTS 10,255,828 B2 * 4/2019 Snyder .................. A61B 1/317
2014/0051049 A1 2/2014 Jarc et al.
2016/0314718 A1 10/2016 Bergs et al.
2019/0206282 A1 * 7/2019 Novokhatskiy ........ G09B 23/30

FOREIGN PATENT DOCUMENTS

JP 2013-544373 A 12/2013
JP 2014-199405 A 10/2014
JP 2016-4079 A 1/2016
JP 2017-32814 A 2/2017
JP 6496096 B1 3/2019
JP 2019-207304 A 12/2019

OTHER PUBLICATIONS

"International Search Report", PCT/JP2020/000004, Mar. 24, 2020, 3 pages (in WO2021137272 file).

* cited by examiner

*Primary Examiner* — James B Hull

(74) *Attorney, Agent, or Firm* — Osha Bergman Watanabe & Burton LLP

(57) ABSTRACT

Provided is an abdominal cavity simulator that allows for diverse and realistic procedure training and is easy to store and carry. The simulator is provided with a pedestal that is provided with multiple fixing portions whereto organ model fixtures are mounted; a pneumoperitoneum cover; and two side plate members that provide a space between the pneumoperitoneum cover and the pedestal for allowing the organ model fixture to be arranged therein. A first recess is provided in the pneumoperitoneum cover; a first protrusion and a second protrusion are provided in the side plate members; and a second recess is provided in the pedestal. In a state in which the direction of either the pedestal or a casing has been changed by 180°, the pneumoperitoneum cover and the side plate members can be secured to each other, and the pedestal and the side plate members can be secured to each other.

18 Claims, 18 Drawing Sheets

(1)

(2)

(1)

(2)

(1)

(2)

(1)

(2)

(1)

(2)

START
Pneumoperitoneum cover is removed from side plate members.
S11
Fasteners are removed.
S12
Side plate members are removed from pedestal.
S13
Organ model fixture is removed from pedestal.
S14
Fasteners are attached to the fixing portions.
S15
Side plate members are superposed on pedestal.
S16
Pneumoperitoneum cover is attached on side plate members.
S17
END (2)

(1)

(2)

ASSEMBLED ABDOMINAL CAVITY SIMULATOR

TECHNICAL FIELD

The present invention relates to an abdominal cavity simulator for training and learning of laparoscopic procedures.

BACKGROUND ART

In recent years, laparoscopic procedure is often performed in operations such as those regarding digestive organs and urinary organs because the scars are small and the postoperative recovery is quick.

However, laparoscopic procedure has a high degree of difficulty, and there is a problem that the skills of the surgeons are likely to differ. Therefore, a technique for effectively performing laparoscopic procedure training is desired.

As a technique for performing laparoscopic procedure training, an abdominal cavity simulator having a casing made of a member simulating a human body shape is known (refer to Patent Document 1).

The abdominal cavity simulator disclosed in Patent Document 1 is provided with a plurality of ports through which surgical instruments can be inserted, and it is possible to perform repeated training. In addition, it is a highly convenient simulator because it is configured so that it can be easily aligned when a biological texture organ model is installed in the simulator.

However, in the abdominal cavity simulator disclosed in Patent Document 1, the target procedure training is limited to the procedure training of laparoscopic procedure, and cannot be used for various procedure trainings which are not limited to laparoscopic surgery.

Further, the abdominal cavity simulator disclosed in Patent Document 1 has a problem that the device is large and it is not easy to carry. In order to make the abdominal cavity simulator a portable structure, it is conceivable to make it a simulator that can be folded compactly. However, there is a problem that the manufacturing cost is high if the simulator is foldable while precisely reproducing the inside of the body cavity.

PRIOR ART

Patent Document

[Patent Document 1] WO 2015/151504 A1

OUTLINE OF THE INVENTION

Problems to be Solved by the Invention

In view of such a situation, it is an object of the present invention to provide an abdominal cavity simulator capable of diverse and realistic procedure training and easy to store and carry.

Means to Solve the Objects

As a result of diligent study, the present inventors did not precisely reproduce everything in the body cavity, but instead placed an appropriate organ model fixture according to the training content and reproduced the inside of the body cavity to the extent necessary for training. As a result, the present inventors found that it is possible to make a simulator that can handle diverse and realistic training by placing an appropriate organ model fixture according to the training content precisely and reproducing the body cavity to the extent necessary for training.

That is, the assembled abdominal cavity simulator of the present invention is used as an abdominal cavity simulator for learning a laparoscopic procedure, and includes a pedestal provided with a plurality of fixing portions for attaching an organ model fixture and a casing simulating a pneumoperitoneum state. A first fitting portion is provided on the pedestal, a second fitting portion is provided on the casing, and the pedestal and the casing can be fixed by fitting the first and second fitting portions, and the pedestal or the casing can be fixed. The pedestal and the casing can be fixed by fitting the first and second fitting portions in a state where one of the pedestal and the casing is turned 180°.

With the above configuration, the position and orientation of the fixed portion can be changed by inverting the upper and lower of the pneumoperitoneum cover or the pedestal. This makes it possible to attach diverse organ model fixtures.

In addition, in this specification, the upper/lower/left/right of the pneumoperitoneum cover and the pedestal are basically the same as the upper/lower/left/right of the human body. That is, assuming that the abdominal cavity simulator is a human body, the head side is upper, the foot side is lower, the right hand side is right, and the left hand side is left. However, in the description of the side plate member described later, it refers to the upper/lower/left/right with the side plate member upright, not the upper/lower/left/right in the human body. Further, in the drawings, the view seen from the foot side will be described as a front view.

In an assembled abdominal cavity simulator of the present invention, the casing includes a pneumoperitoneum cover simulating a pneumoperitoneum state and two side plate members providing a gap for arranging an organ model fixture between the pneumoperitoneum cover and the pedestal. The pneumoperitoneum cover is provided with a first recess, the side plate member is provided with a first protrusion and a second protrusion, and the pedestal is provided with a second recess. The second recess and the second protrusion respectively correspond to the first fitting portion and the second fitting portion, the pneumoperitoneum cover and the side plate member can be fixed by fitting the first recess and the first protrusion, and the pedestal and the side plate member can be fixed by fitting the second recess and the second protrusion. And the pneumoperitoneum cover and the side plate member can be fixed by fitting the first recess and the first protrusion with either the pedestal or the casing turned 180°, and the pedestal and the side plate member can be fixed by fitting the second recess and the second protrusion.

By separating the casing into a pneumoperitoneum cover and a side plate member, it can be easily assembled and disassembled and folded and stored.

The side plate members are preferably two members having the same structure, but three or more members may be used, or members which have different structures may be used, from the viewpoint of convenience of left and right replacement and replacement in case of damage.

It is preferable that the first protrusion, the second protrusion, the first recess and the second recess are each present in an even-number of two or more, and are provided in the same number above and below the pneumoperitoneum cover and the pedestal.

In case of the pneumoperitoneum cover, side plate member and pedestal are assembled, the side plate member is fixed in an upright state on the pedestal. Therefore, to make it easier to maintain the fixed state at the place where the pedestal and the side plate member are fixed, it is preferable that the second protrusion is provided higher than the first protrusion and the second recess is formed deeper than the first recess.

In addition, unlike the above configuration, instead of fitting the recess and the protrusion, the pneumoperitoneum cover and the side plate member or the pedestal and the side plate member may be connected by using a hinge mechanism so as to be foldable. Further, a protrusion may be provided on the pneumoperitoneum cover or the pedestal, and a recess may be formed on the side plate member.

In an assembled abdominal cavity simulator of the present invention, it is preferable that a third protrusion and a fourth protrusion are provided on the side plate member, and the second recess of the pedestal and the fourth protrusion are fitted to each other on the pedestal. This will allow the side plate member to be layered and fixed on the pedestal, and the pneumoperitoneum cover can be layered and fixed on the side plate member by fitting the first recess of the pneumoperitoneum cover and the third protrusion.

With the above configuration, when not in use, it can be easily stacked and stored, and it is easy to carry.

It is preferable that an assembled abdominal cavity simulator of the present invention is further provided a fastener formed with a T-shaped groove portion to reinforce the fixed state of the pedestal and the side plate member, when the second recess of the pedestal and the second protrusion of the side plate member are fitted to fix the pedestal and the side plate member.

If the side plate member is composed of two pieces and is mounted at opposite positions on the pedestal, the side plate member may swing after mounting. Therefore, by providing the fastener, such swinging is prevented and the stability of the device is improved.

In the assembled abdominal cavity simulator of the present invention, it is preferable that the fixing portion is provided with a magnet, and the fastener is provided with a metal member having a magnetic material, and the metal member can be fixed to the magnet and stored.

Fasteners may be lost when not in use. By fixing the metal member provided on the fastener to the magnet provided on the fixing portion, it is possible to prevent the fastener from being lost when not in use.

In an assembled abdominal cavity simulator of the present invention, in a case in which a notch is formed in the side plate member, and the notch fits the second recess of the pedestal and the fourth protrusion of the side plate member to layer the side plate member on the pedestal, it is preferable that the notch is formed at a position that does not interfere with the fixing portion and the metal member fixed to the magnet.

By forming a notch in the side plate member, in a case in which the side plate member is layered on the pedestal, the side plate member does not interfere with the fixing portion and the metal member fixed to the magnet, and can be stacked compactly for storability and portability.

In an assembled abdominal cavity simulator of the present invention, it is preferable that an odd number of fixing portions and an even number of fixing portions are provided on one side in the longitudinal direction of the pedestal from the center of the pedestal, and one of the odd number of fixing portions is provided in the center of the pedestal in the lateral direction and the even number of fixing portions is provided so as to straddle the center of the pedestal in the lateral direction.

Further, it is more preferable that one fixing portion is provided on one side and two fixing portions are provided on the other side in the longitudinal direction of the pedestal from the center of the pedestal, and the one fixing portion is provided in the center of the pedestal in the lateral direction and the two fixing portions are provided so as to straddle the center of the pedestal in the lateral direction.

By providing one fixing portion in the center of the pedestal in the lateral direction, it is possible to attach the organ model fixture using spaces on the left and right of the fixing portion. Further, by providing two fixing portions straddling the center of the pedestal in the lateral direction, it is possible to attach the organ model fixture using the central space. Further, by fixing the organ model fixture using the two fixing portions, the stability at the time of fixing can be improved.

Effects of the Invention

The assembled abdominal cavity simulator of the present invention has the effects of being able to perform diverse and realistic procedure training and being easy to store and carry.

BEST MODE FOR CARRYING OUT THE INVENTION

Embodiments of the present invention will be described in detail below with reference to the drawings. The present invention is not limited to the following embodiments and examples shown in the figures, and the present invention can be variously changed in design.

Embodiment 1

Figure 1:
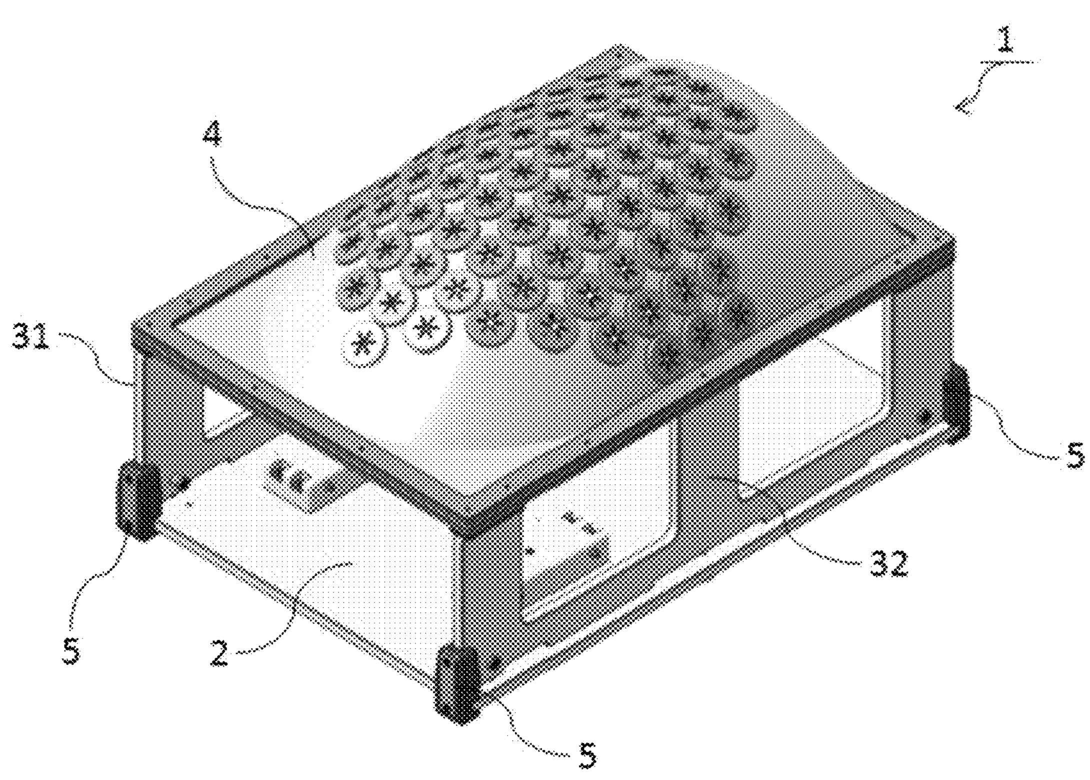
FIG. 1 is an external perspective view of an assembled abdominal cavity simulator.
Figure 2:
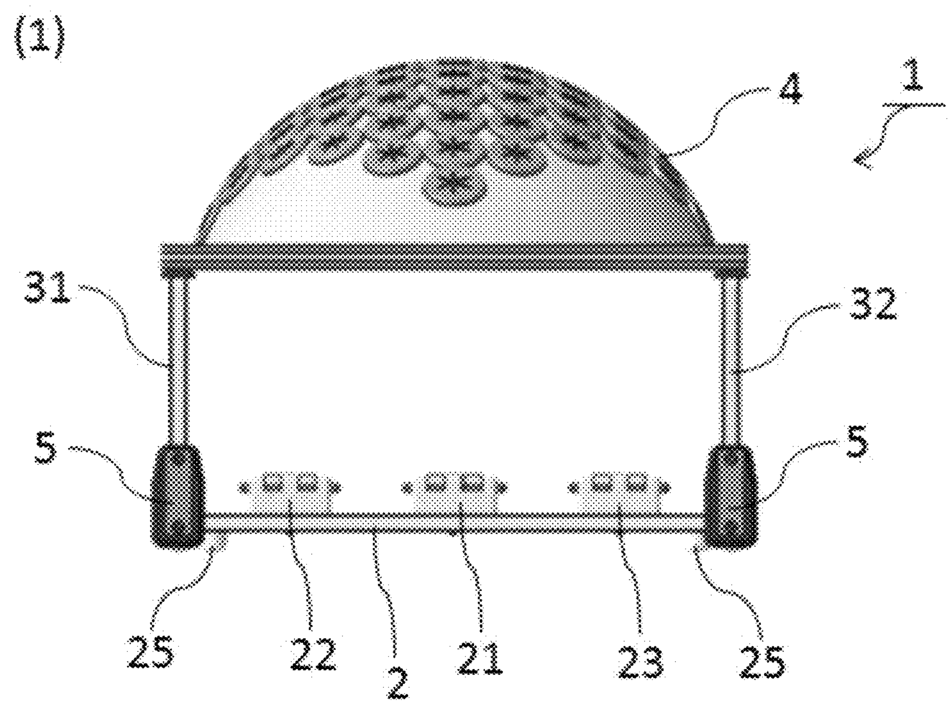
FIG. 2 is an external view 1 of an assembled abdominal cavity simulator.
Figure 2:
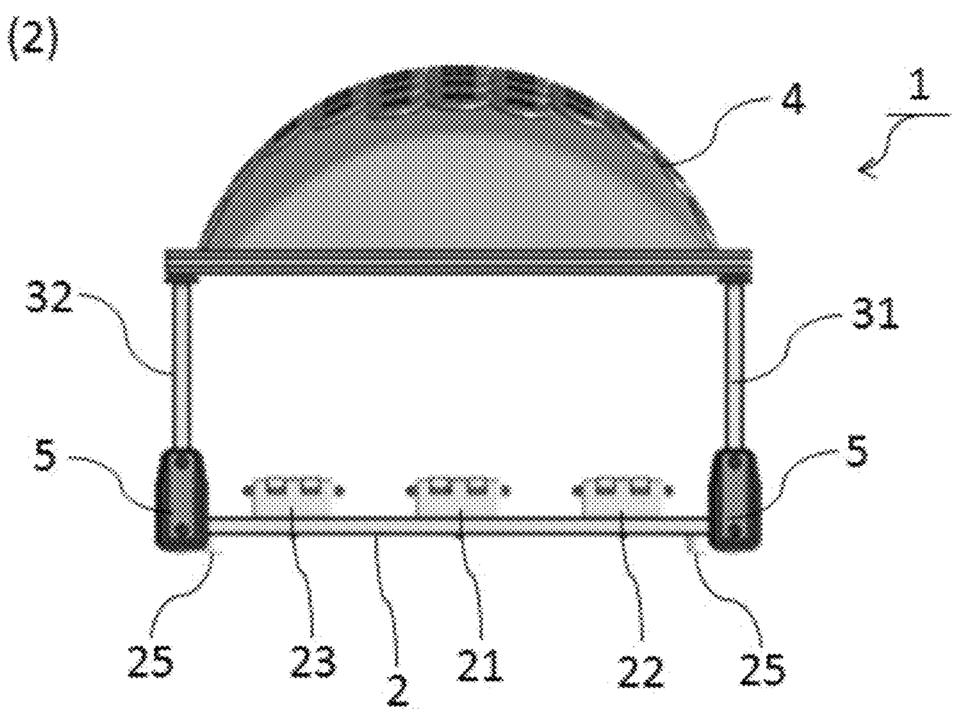
Figure 3:
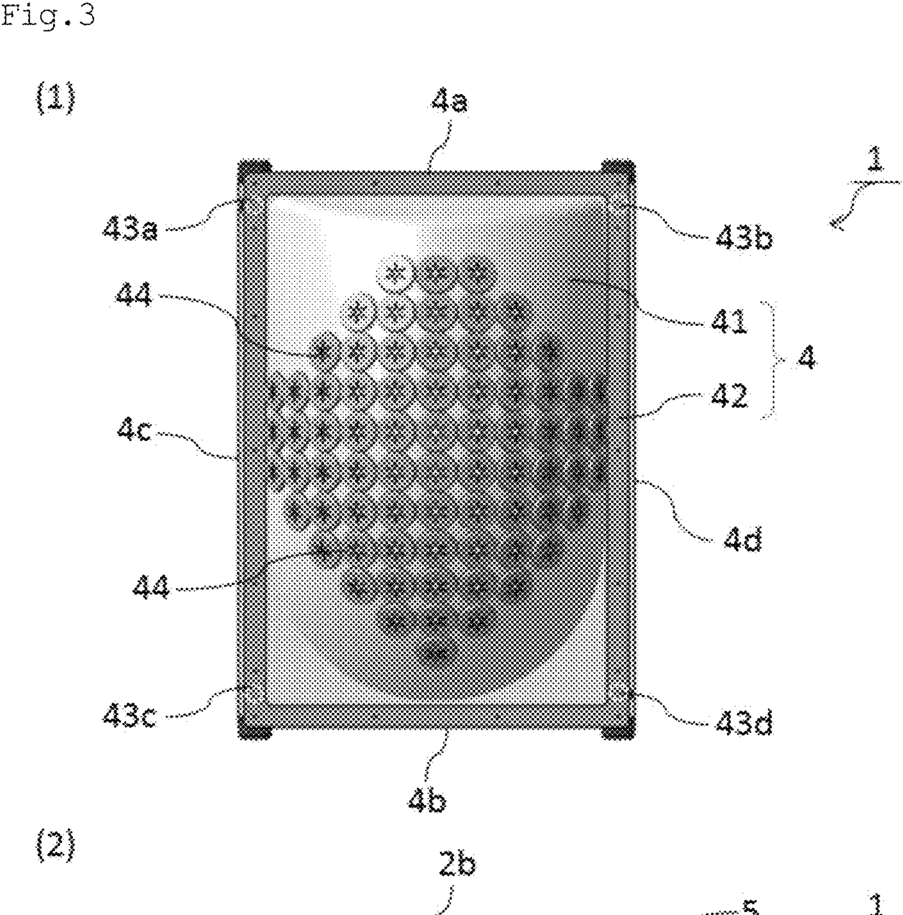
FIG. 3 is an external view 2 of an assembled abdominal cavity simulator.
Figure 3:
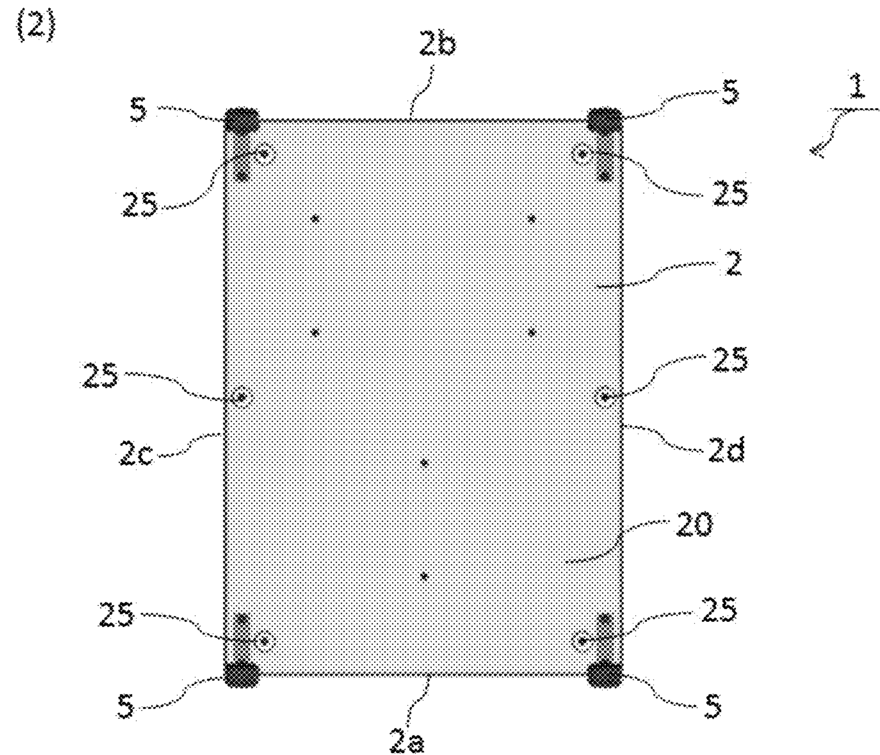
Figure 4:
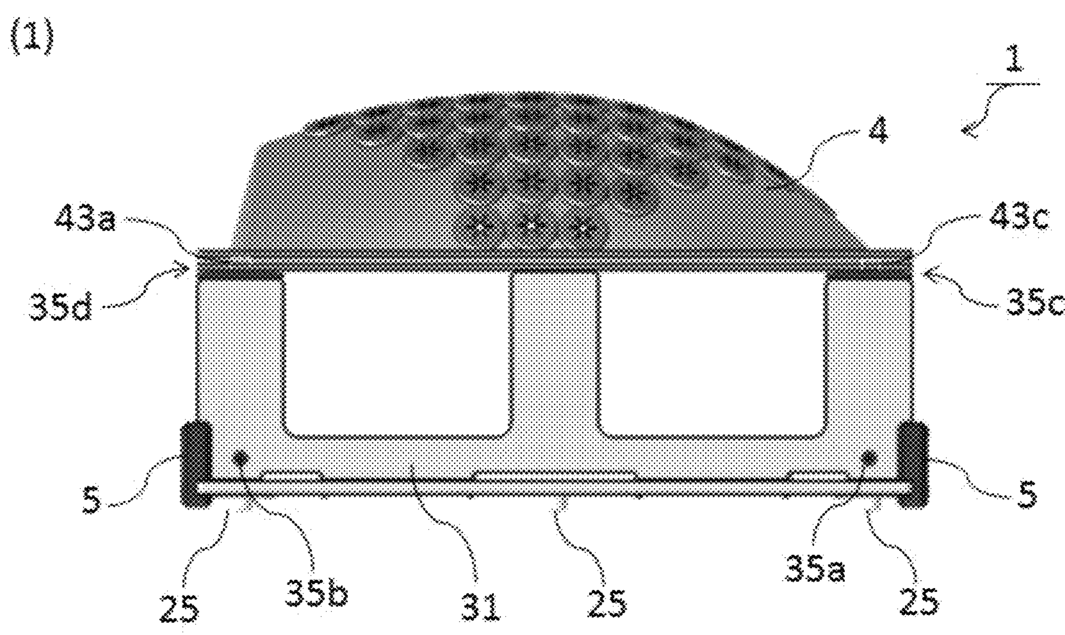
FIG. 4 is an external view 3 of an assembled abdominal cavity simulator.
Figure 4:
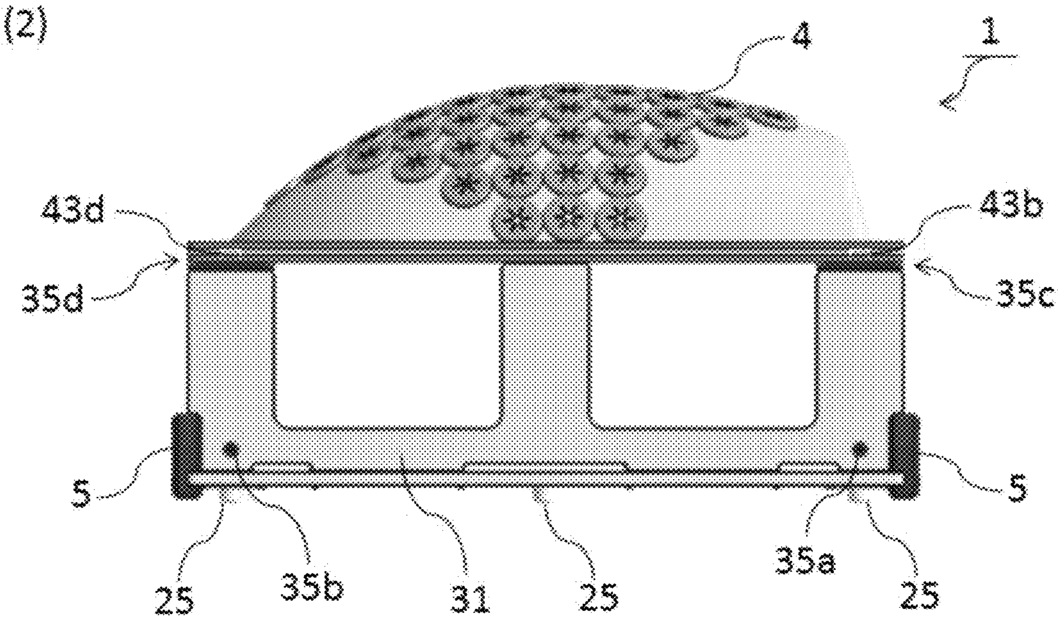

FIG. 1 shows an external perspective view of the assembled abdominal cavity simulator. FIG. 2 to FIG. 4 show external views of the assembled abdominal cavity simulator, FIG. 2 (1) shows a front view, FIG. 2 (2) shows a rear view, FIG. 3 (1) shows a plan view, FIG. 3 (2) shows a bottom view, FIG. 4 (1) shows a left side view, and FIG. 4 (2) shows a right side view.

As shown in FIG. 1, the assembled abdominal cavity simulator 1 includes a pedestal 2, side plate members (31, 32), a pneumoperitoneum cover 4, and fasteners 5. The assembled abdominal cavity simulator 1 shown in FIG. 1 shows an already assembled state, but is actually used by attaching an organ model fixture (not shown) on the pedestal 2.

Figure 5:
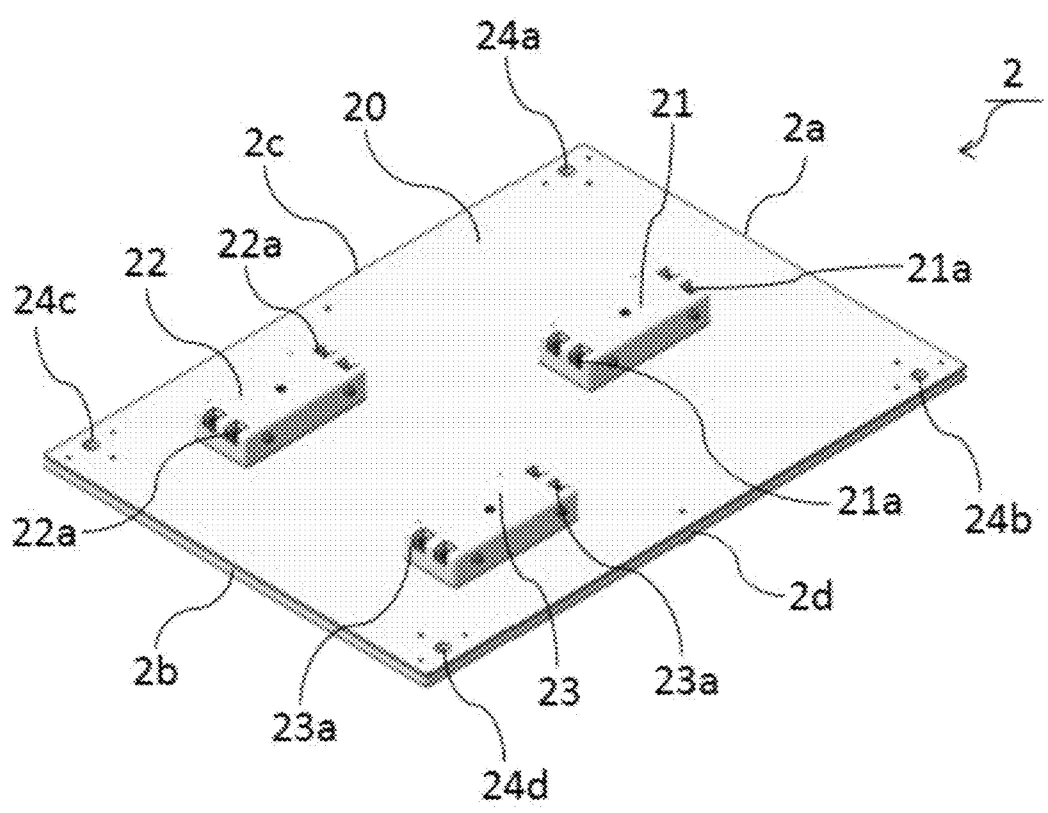
FIG. 5 is an external perspective view of a pedestal.

Here, each member constituting the assembled abdominal cavity simulator 1 will be described. FIG. 5 shows an external perspective view of the pedestal. As shown in FIG. 5, the pedestal 2 is composed of a pedestal main body 20 and fixing portions (21 to 23), and the fixing portions (21 to 23) are provided on the surface of the pedestal main body 20. A magnet 21*a* is provided inside the fixing portion 21. Similarly, a magnet 22*a* is provided inside the fixing portion 22, and a magnet 23*a* is provided inside the fixing portion 23. As shown in FIG. 5, the fixing portions (21 to 23) are provided with openings at the upper and lower end portions, and the magnets (21*a*, 22*a*, 23*a*) are exposed and can be attached with a metal having a magnetic material.

Recesses (24*a* to 24*d*) are formed at the four corners on the surface of the pedestal body 20, and the structure is such that the protrusions (34*a* to 34*d*) provided on the side plate member 3 described later can be fitted. Further, as shown in FIG. 3 (2), six resin non-slip members 25 are provided on the back surface of the pedestal main body 20.

Figure 6:
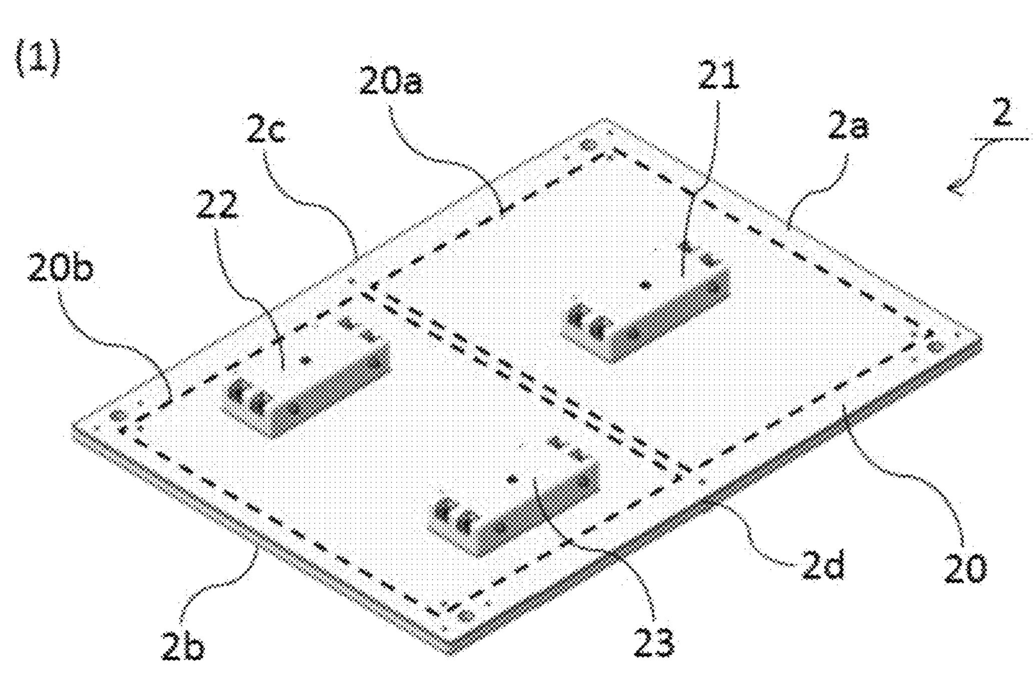
FIG. 6 is an explanatory view regarding an arrangement of a fixing portion on a pedestal.
Figure 6:
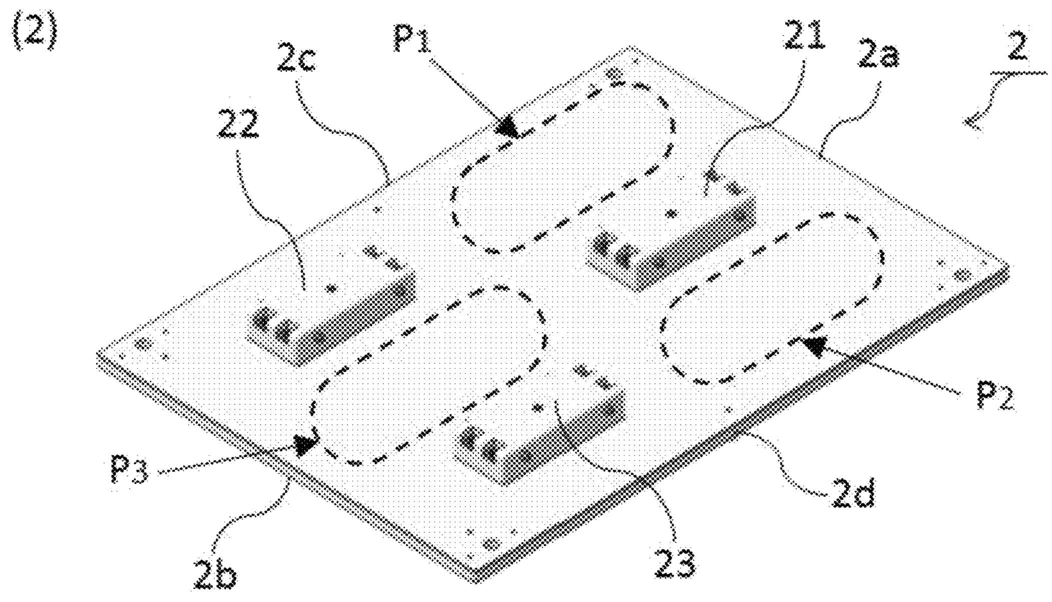

FIG. 6 shows an explanatory view regarding an arrangement of the fixing portion on the pedestal. As shown in FIG. 6 (1), the fixing portion 21 is provided on the upper portion 20*a* of the pedestal main body 20, and the fixing portion (22, 23) is provided on the lower portion 20*b* of the pedestal main body 20.

As a result, as shown in FIG. 6 (2), for example, an organ model fixture (not shown) having a shape may be attached using the right end position P1 or the left end position P2 to the pedestal 2 when needed. It is possible to design the organ model fixture to have specifications to be attached using the fixing portion 21.

Further, for example, in case there is a need to attach the organ model fixture having a shape using the central position P3 to the pedestal 2, the organ model fixture with specifications to be attached using the fixing portion (22, 23) can be designed.

The pedestal body 20 has a structure that can be used in a state where the orientation is changed by 180°. Therefore, in case it is desired to use an organ model fixture in which fixing portions are not provided at the left and right positions at the lower end portion of the pedestal body 20, the upper end portion 2*a* is used as the lower end portion and the lower end portion 2*b* is used as the upper end portion. Therefore, unlike FIG. 6 (1), it can be used as the pedestal 2 having a fixing portion at the lower portion and at the center.

Figure 7:
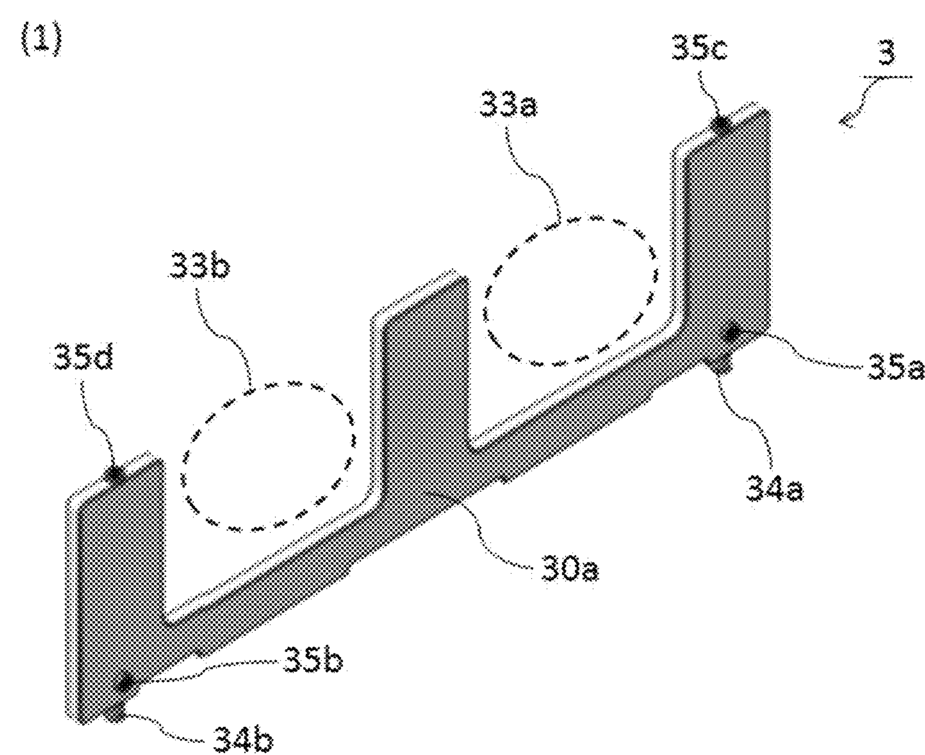
FIG. 7 is an external perspective view of a side plate member.
Figure 7:
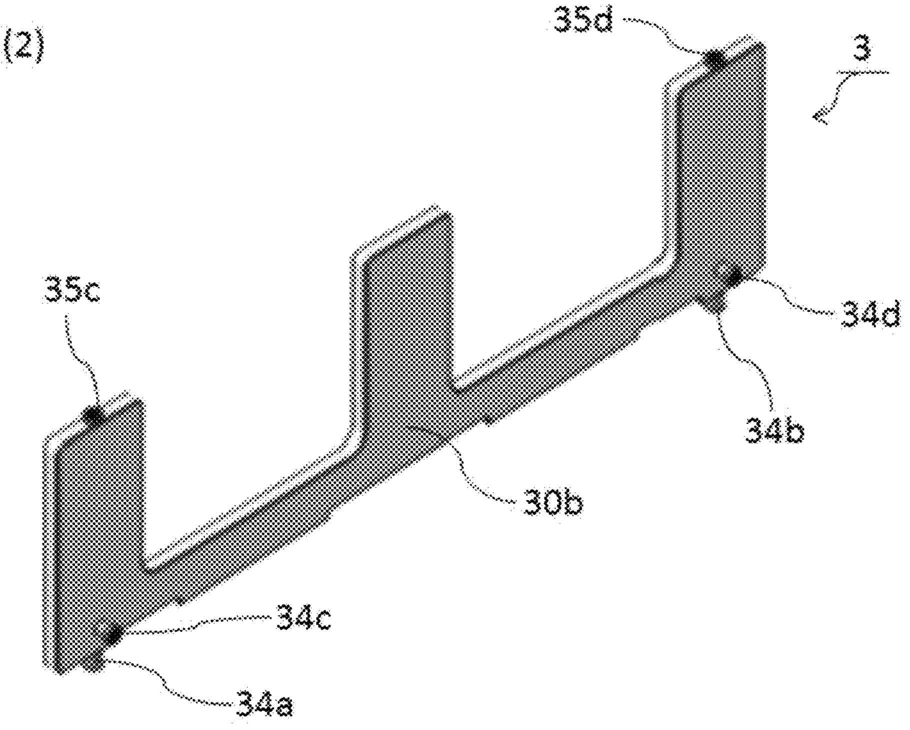

FIG. 7 is an external perspective view of the side plate member, FIG. 7 (1) is a perspective view seen from the outer surface, and FIG. 7 (2) is a perspective view seen from the inner surface. The side plate member 3 shown in FIG. 7 has the same structure as the side plate member (31, 32) shown in FIG. 1. That is, the side plate members (31, 32) use different reference numerals for convenience of explanation, but have exactly the same shape and structure as shown in FIGS. 4 (1) and 4 (2). For example, in FIG. 1, the left and right side plate members (31, 32) can be replaced in reverse.

As shown in FIGS. 7 (1) and 7 (2), the side plate member 3 is provided with two types of protrusions: protrusions (34*a* to 34*d*) and protrusions (35*a* to 35*d*). As shown in FIG. 7 (2), the protrusions (34*a*, 34*b*) are provided at the lower end portion of the side plate member 3, and the protrusions (34*c*, 34*d*) are provided on the inner surface 30*b* of the side plate member 3. Further, as shown in FIG. 7 (1), the protrusions (35*a*, 35*b*) are provided on the outer surface 30*a* of the side plate member 3, and the protrusions (35*c*, 35*d*) are provided on the upper end portion of the side plate member 3. The protrusions (34*a* to 34*d*) are intended to be used for attaching and fixing the side plate member 3 to the pedestal 2, and the protrusions (35*a* to 35*d*) are intended to be used for attaching and fixing the pneumoperitoneum cover 4 to the side plate member 3.

Notches (33*a*, 33*b*) are formed in the side plate member 3, and the side plate member 3 does not interfere with the fixing portions (21 to 23) when folded. In addition, since the notches (33*a*, 33*b*) are formed, a surgeon or an assistant easily inserts hands or instruments through the notches (33*a*, 33*b*) to fine-tune the position of the organ model during training. As shown in FIGS. 2 (1) and 2 (2), since the front and back surfaces of the assembled abdominal cavity simulator 1 are in an open state, it is also possible to insert hands or instruments from the front or back direction of the assembled abdominal cavity simulator 1 to fine-tune the position of the organ model.

Figure 8:
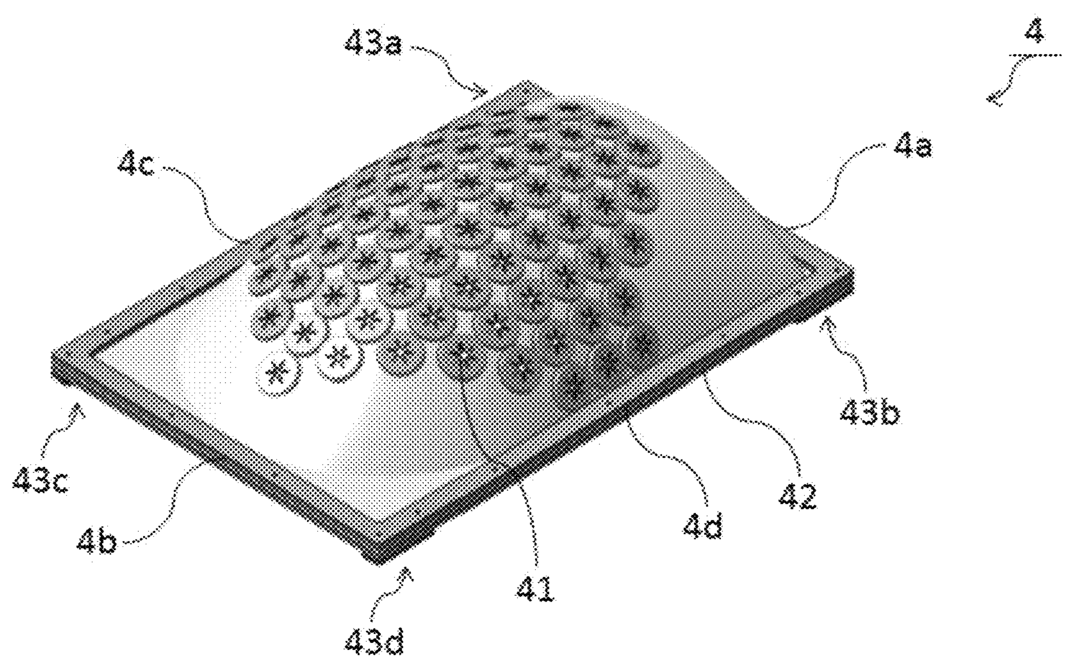
FIG. 8 is an external perspective view of a pneumoperitoneum cover.

FIG. 8 shows an external perspective view of the pneumoperitoneum cover. As shown in FIG. 8, the pneumoperitoneum cover 4 is composed of a pneumoperitoneum 41 and a frame 42. The pneumoperitoneum 41 is made of a soft resin, and as shown in FIG. 3 (1), the abdomen of a patient in a pneumoperitoneum state is realistically reproduced. Further, the frame portion 42 is made of a hard resin, and the upper and lower left and right end portions of the pneumoperitoneum 41 are sandwiched and fixed by two upper and lower members. A plurality of port holes 44 are formed in the pneumoperitoneum 41, and it is possible to perform procedure training by inserting endoscopes, forceps, or the like from various positions and angles.

Further, recesses (43*a* to 43*d*) are formed on the back surfaces of the four corners of the frame portion 42, and have a structure capable of fitting with the protrusions (35*a* to 35*d*).

Figure 9:
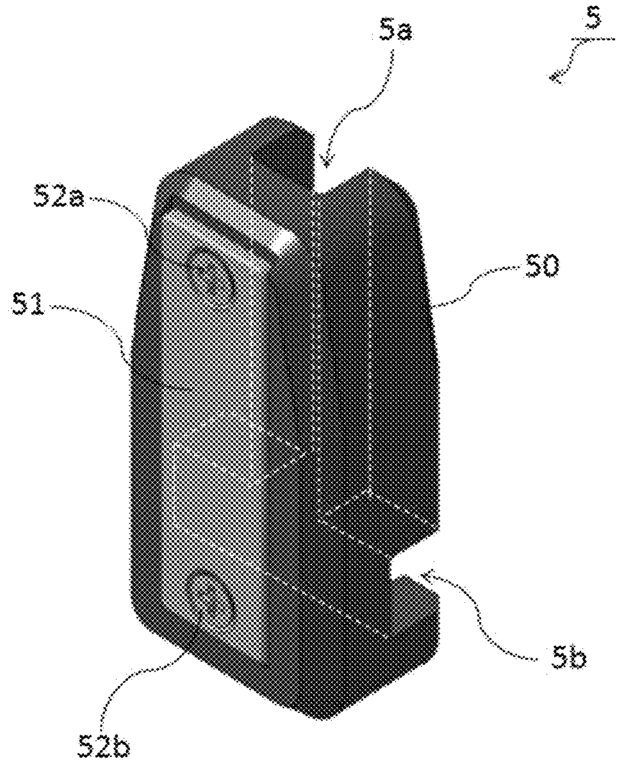
FIG. 9 is an external perspective view of fastener.

FIG. 9 shows an external perspective view of a fastener. As shown in FIG. 9, the fastener 5 is composed of a fastener main body 50 and a metal plate 51, and the metal plate 51 is screwed and fixed using screws (52*a*, 52*b*). The fastener body 50 is made of a hard resin.

As shown in FIG. 9, the fastener main body 50 is formed with groove portions 5*a* on the upper and lower sides and groove portions 5*b* on the left and right sides, and the groove portions 5*a* and the groove portions 5*b* are connected in an inverted T shape at intersections. The fastener 5 is used to prevent the side plate member 3 from swinging left and right on the pedestal 2 after the side plate member 3 is attached to the pedestal 2. Specifically, the groove portion 5*a* fits with the end portion of the side plate member 3, and the groove portion 5*b* fits with the upper and lower end portions of the pedestal 2 and is fixed.

Figure 10:
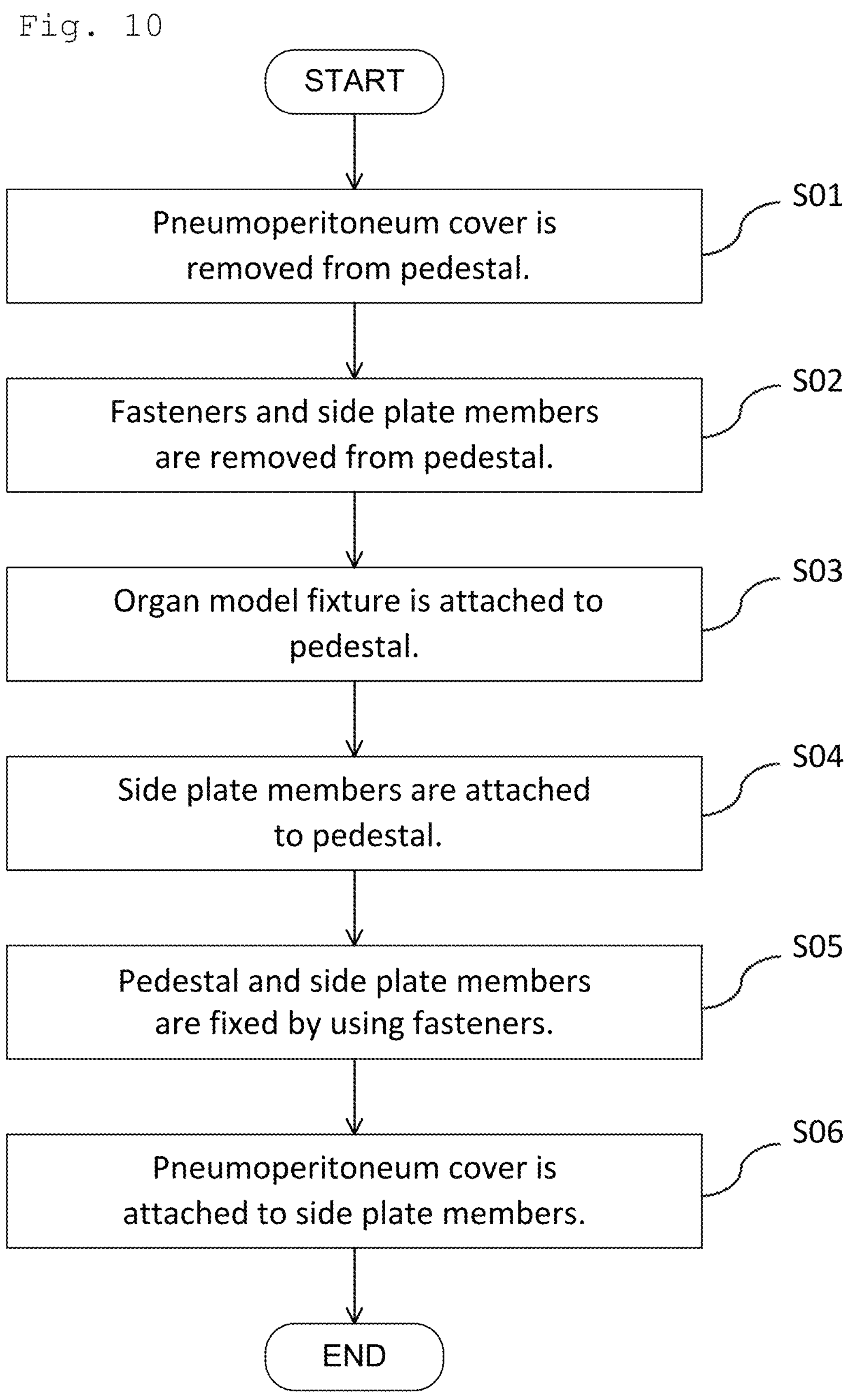
FIG. 10 is an assembly flow diagram of an assembled abdominal cavity simulator.
Figure 11:
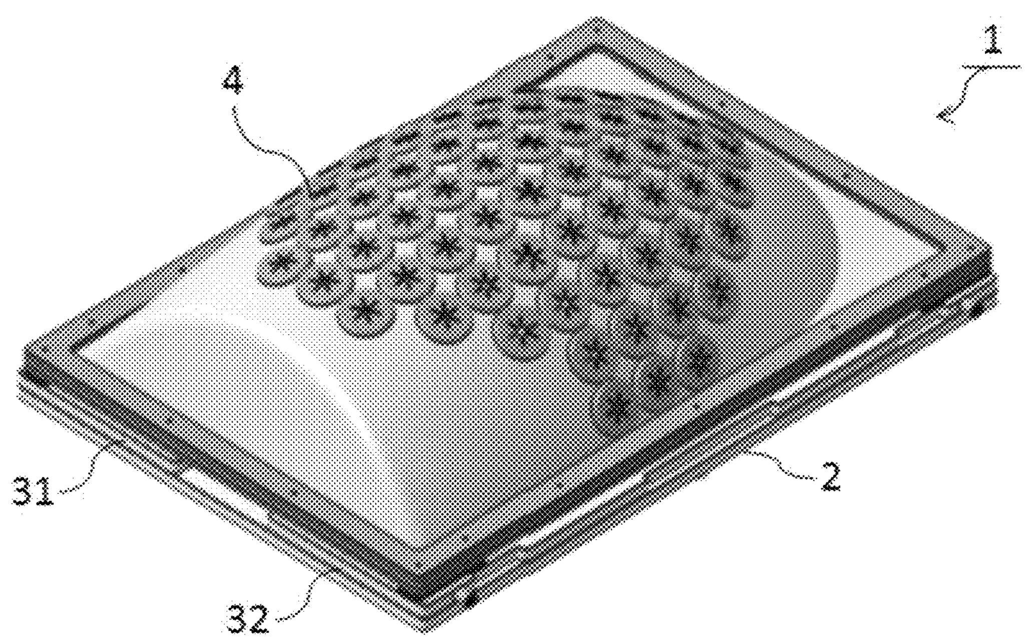
FIG. 11 is an image diagram of an assembled abdominal cavity simulator before assembly.
Figure 12:
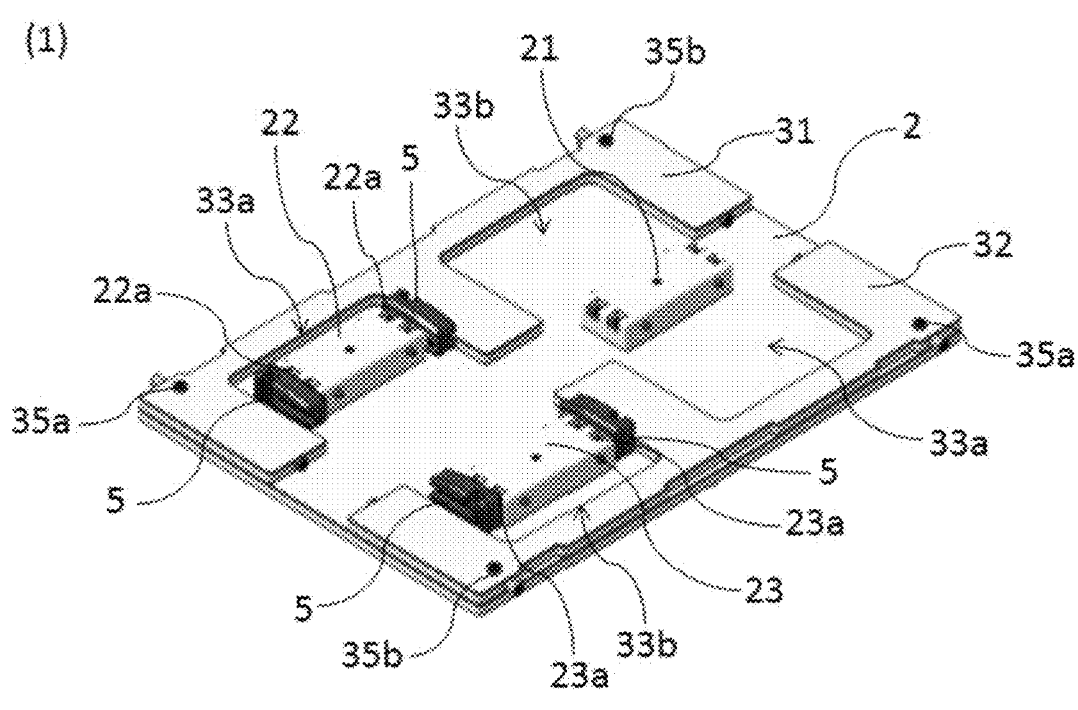
FIG. 12 is an assembly image diagram 1 of an assembled abdominal cavity simulator.
Figure 12:
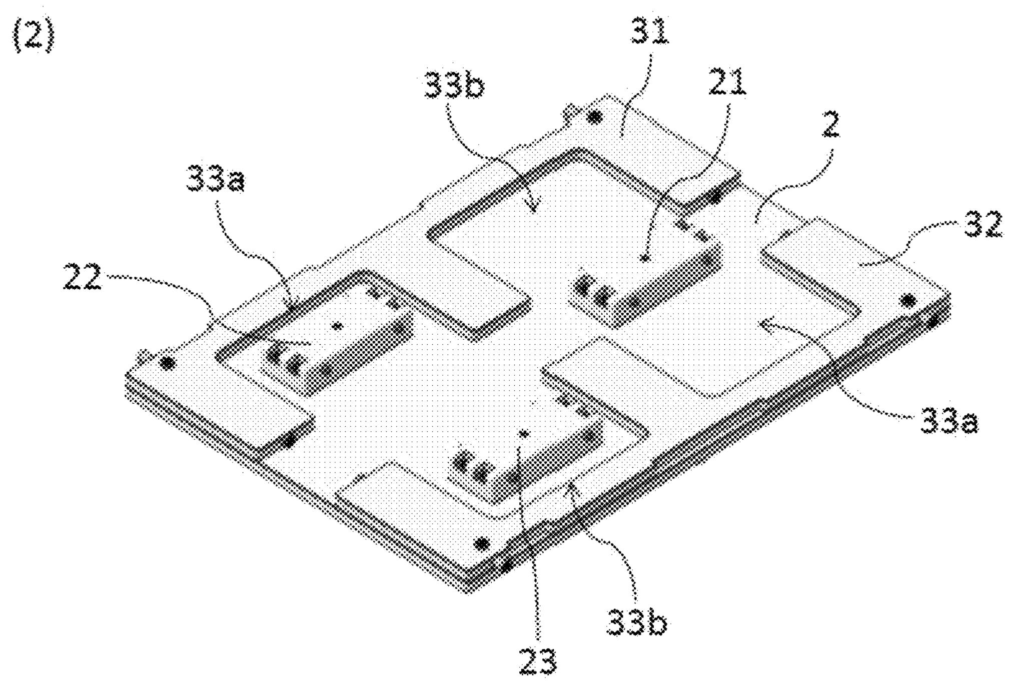
Figure 13:
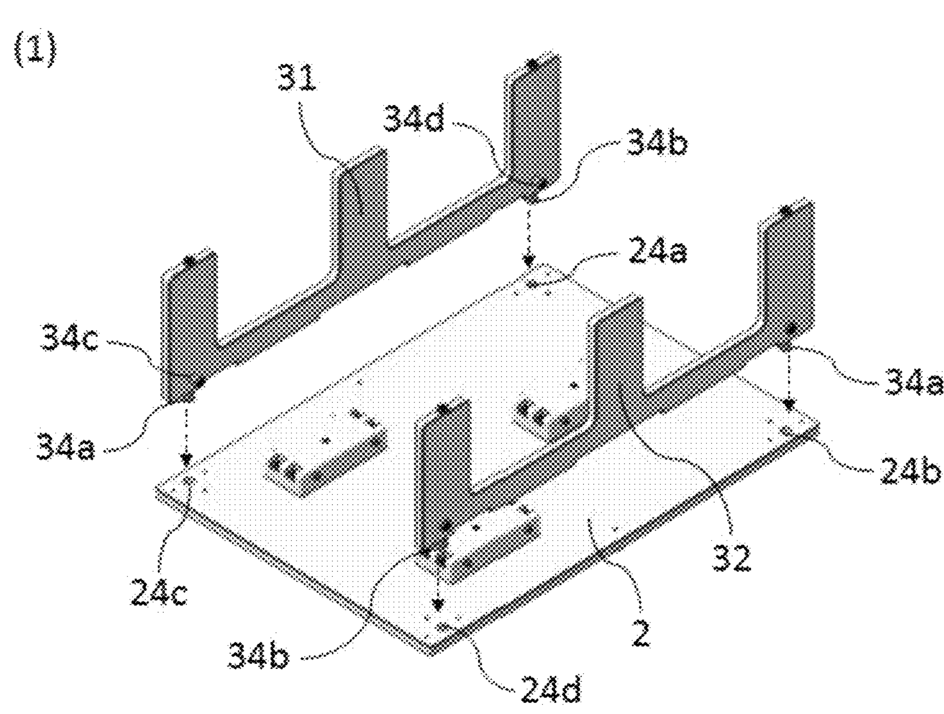
FIG. 13 is an assembly image 2 of an assembled abdominal cavity simulator.
Figure 13:
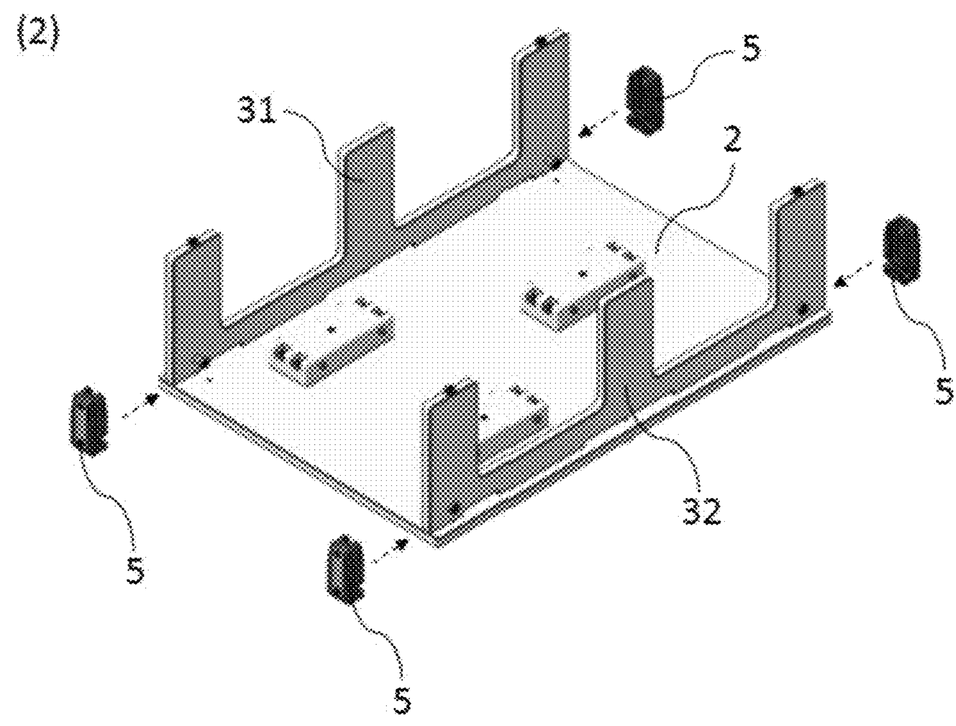
Figure 14:
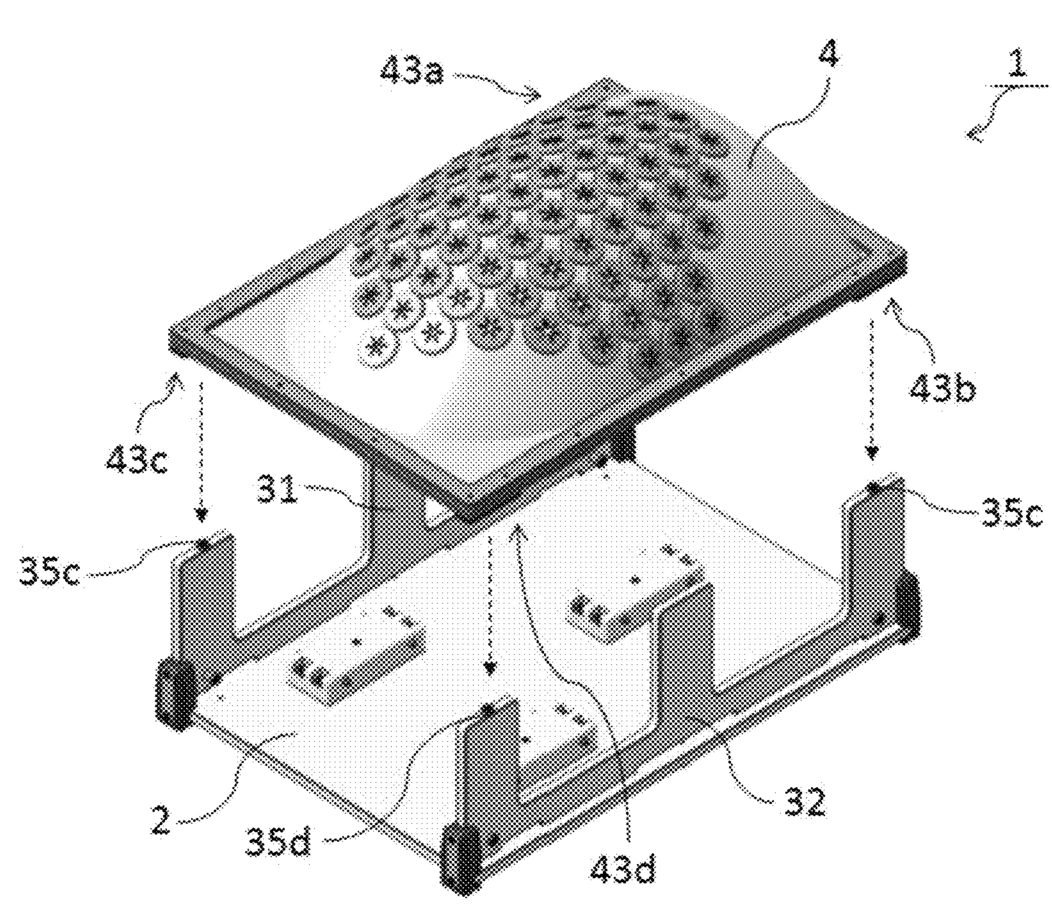
FIG. 14 is an assembly image 3 of an assembled abdominal cavity simulator.

Next, features of an assembled abdominal cavity simulator will be described while explaining how to use the assembled abdominal cavity simulator. FIG. 10 shows an assembly flow diagram of the assembled abdominal cavity simulator. FIG. 11 shows an image diagram of the assembled abdominal cavity simulator before assembly. Further, FIGS. 12 to 14 show an assembly image diagram of the assembled abdominal cavity simulator.

As shown in FIG. 11, in the assembled abdominal cavity simulator 1, the side plate member (31, 32) is layered on the pedestal 2, and the pneumoperitoneum cover 4 is further layered on the side plate member (31, 32). The pedestal 2, the side plate members (31, 32) and the pneumoperitoneum cover 4 are not simply layered. The pedestal 2 and the side plate members (31, 32) are fixed by fitting the recesses (24*a* to 24*d*) formed in the pedestal 2 shown in FIG. 5 and the protrusions (34*c*, 34*d*) provided in the side plate members (31, 32) (see FIG. 7 (2)). Further, the side plate members (31, 32) and the pneumoperitoneum cover 4 are fixed, and their shapes are such that it is easy to maintain the layered state without shifting from front to back and left to right by fitting the protrusions (35*a*, 35*b*) provided on the side plate members (31, 32) (see FIG. 7 (1)) and the recesses (43*a* to 43*d*) formed on the pneumoperitoneum cover 4 shown in FIG. 4. In this way, the assembled abdominal cavity simulator 1 can be folded compactly when not in use, and has a structure that makes it easy to maintain the layered state. Therefore, it can be stored in a special case or the like and be easily carried and used.

As shown in FIG. 10, to use the assembled abdominal cavity simulator 1, first, the pneumoperitoneum cover 4 is removed from the pedestal 2 (step S01). FIG. 12 (1) shows a state in which the pneumoperitoneum cover 4 is removed from the pedestal 2. As shown in FIG. 12 (1), side plate members (31, 32) are layered on the pedestal 2 in a folded state. Further, fasteners 5 are fixed to the fixing portion 22 and the fixing portion 23. As described above, the fixing portions (22, 23) are provided with magnets (22*a*, 23*a*), respectively, and each fastener 5 is provided with a metal plate 51 having a magnetic material, so that each fastener 5 is fixed by using the magnetic force of the magnets (22*a*, 23*a*). Although fasteners 5 are fixed to the fixing portion 22 and the fixing portion 23 in FIG. 12 (1), a fastener 5 may also or instead be fixed to the fixing portion 21.

In case the side plate members (31, 32) were superposed on the pedestal 2, the notches (33*a*, 33*b*) formed in the side plate members (31, 32) have a structure that does not do anything to interfere with the fixing portions (21 to 23) and the fasteners 5.

Next, as shown in FIG. 10, after removing the pneumoperitoneum cover 4 from the pedestal 2, the fasteners and the side plate members are removed from the pedestal (step S02). FIG. 12 (2) shows the state in which each fastener 5 is removed from the state shown in FIG. 12 (1). Further, FIG. 13 (1) is an explanatory view of attaching the side plate members (31, 32) on the pedestal 2. In FIG. 13 (1), the side plate members (31, 32) are stacked on the pedestal 2 and have been removed from the pedestal 2 and are in upright states.

After removing the fasteners 5 and the side plate members (31, 32) from the pedestal 2, an organ model fixture is attached to the pedestal 2 (step S03), although not shown here. Examples of the organ model fixture to be attached include fixtures used for laparoscopic procedure training such as a uterine model fixture and a gastric model fixture, but the fixtures are not limited to the procedure training using a laparoscope, for example. Organ model fixtures such as heart model fixtures may be attached. That is, any organ model fixture having an attachment portion suitable for the fixing portions (21 to 23) may be used. And in some cases, it is also possible to do the procedure training without using the pneumoperitoneum cover 4 or the side plate member (31, 32).

Further, in the case of attaching the organ model fixture to the pedestal 2, it is preferable to arrange the organ model on the organ model fixture in advance.

After attaching the organ model fixture to the pedestal 2, the side plate members (31, 32) are attached to the pedestal 2 (step S04). Specifically, as shown in FIG. 13 (1), the protrusion 34*b* provided on the side plate member 31 is inserted into the recess 24*a* formed in the pedestal 2, and the protrusion 34*a* is inserted into the recess 24*c* to be fitted. Further, the protrusion 34*a* provided on the side plate member 32 is inserted into the recess 24*b*, and the protrusion 34*b* is inserted into the recess 24*d* to be fitted. As described above, since the side plate members (31, 32) have the same structure, the protrusions (34*a*, 34*b*) provided on the side plate member 31 are inserted into the recesses (24*b*, 24*d*), respectively. And it is also possible to insert the protrusions (34*a*, 34*b*) provided in the side plate member 32 into the recesses (24*c*, 24*a*), respectively, and fit them.

After attaching the side plate members (31, 32) to the pedestal 2, as shown in FIG. 13 (2), the pedestal 2 and the side plate members (31, 32) are fixed by using the fasteners 5 (step S05). Specifically, the groove portions (5*a*, 5*b*) of the fasteners 5 are fitted and fixed at the locations where the upper and lower end portions of the pedestal 2 and the left and right end portions of the side plate members (31, 32) abut.

After fixing the pedestal 2 and the side plate members (31, 32) using the fasteners 5, the pneumoperitoneum cover 4 is attached to the side plate members (31, 32) as shown in FIG. 14 (step S06).

After attaching the pneumoperitoneum cover 4, the surgeon can insert endoscopes, forceps, or the like (not shown) through the port hole 44 to perform the procedure training.

Figure 15:
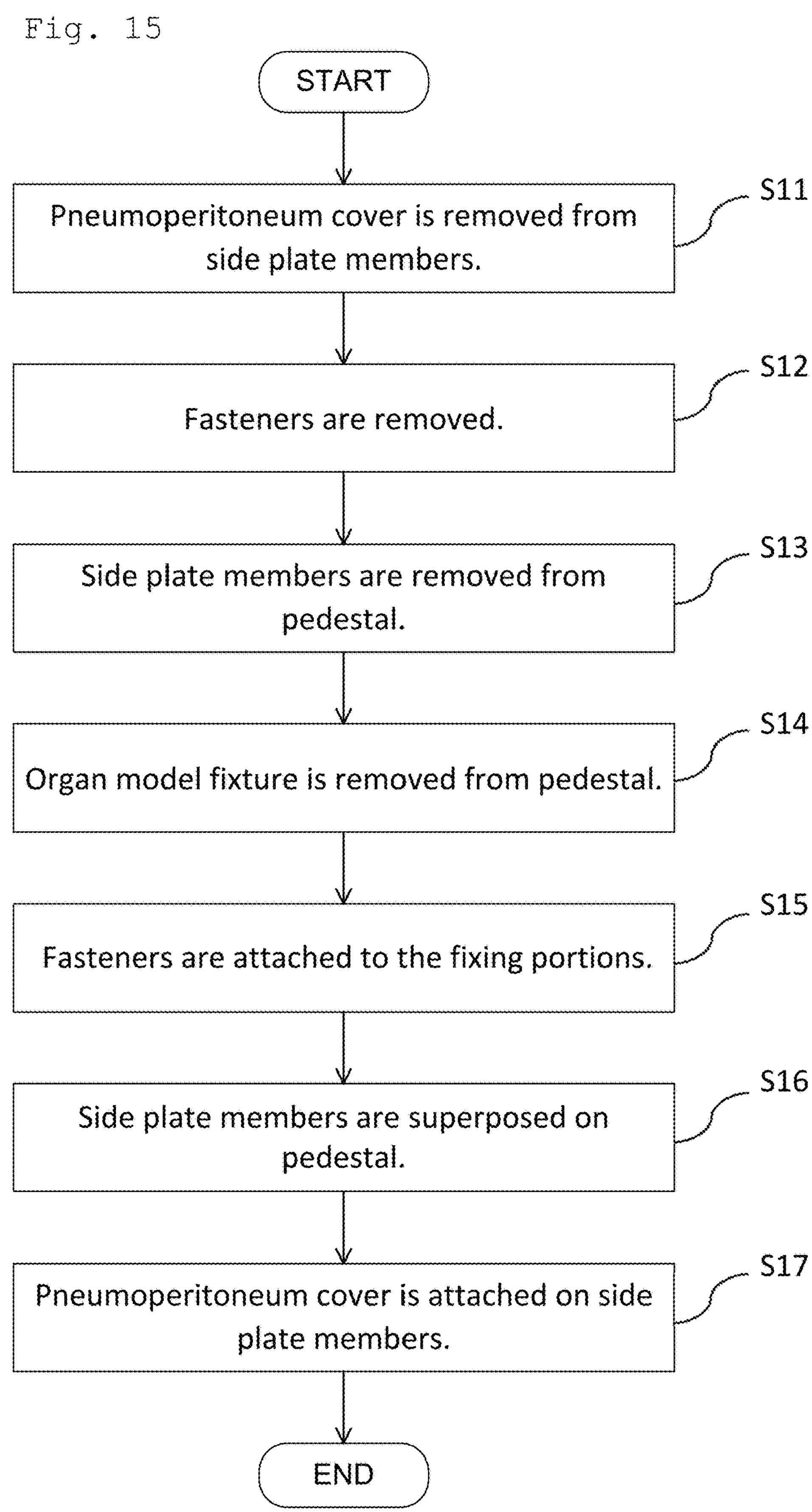
FIG. 15 is a disassembly flow diagram of an assembled abdominal cavity simulator.

FIG. 15 shows a disassembly flow diagram of an assembled abdominal cavity simulator. After training using the assembled abdominal cavity simulator 1, the assembled abdominal cavity simulator 1 can be disassembled, folded, and stored in a reverse procedure of the assembly. Specifically, as shown in FIG. 15, first, the pneumoperitoneum cover 4 is removed from the side plate members (31, 32) (step S11). Next, the fasteners 5 are removed (step S12). The side plate members (31, 32) are removed from the pedestal 2 (step S13). The organ model fixture is removed from the pedestal 2 (step S14). The fasteners 5 are attached to the fixing portion (22, 23) (step S15). The side plate members (31, 32) are superposed on the pedestal 2 (step S16). The pneumoperitoneum cover 4 is attached on the side plate members (31, 32) (step S17).

Embodiment 2

Figure 16:
FIG. 16 is an installation image diagram 1 of a uterine model fixture.
Figure 16:
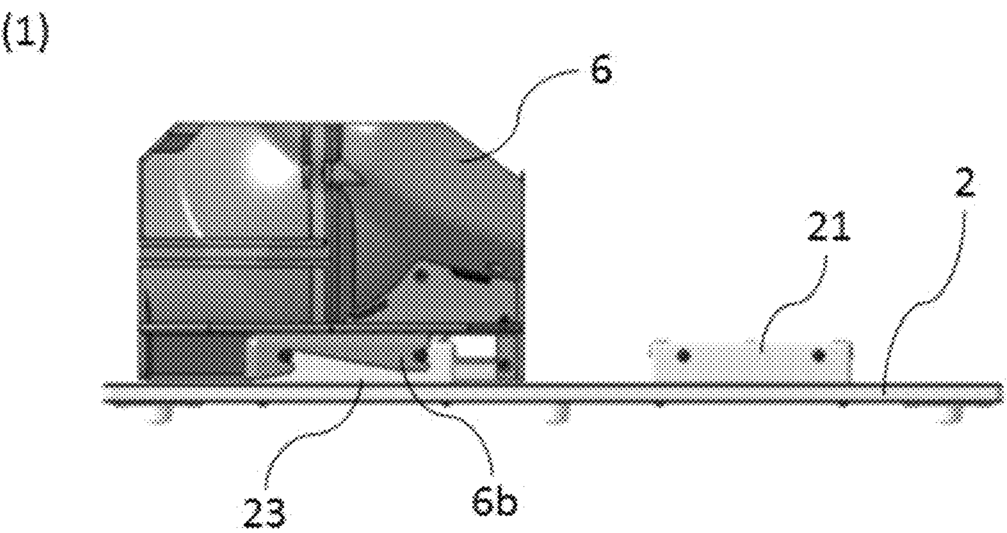
Figure 16:
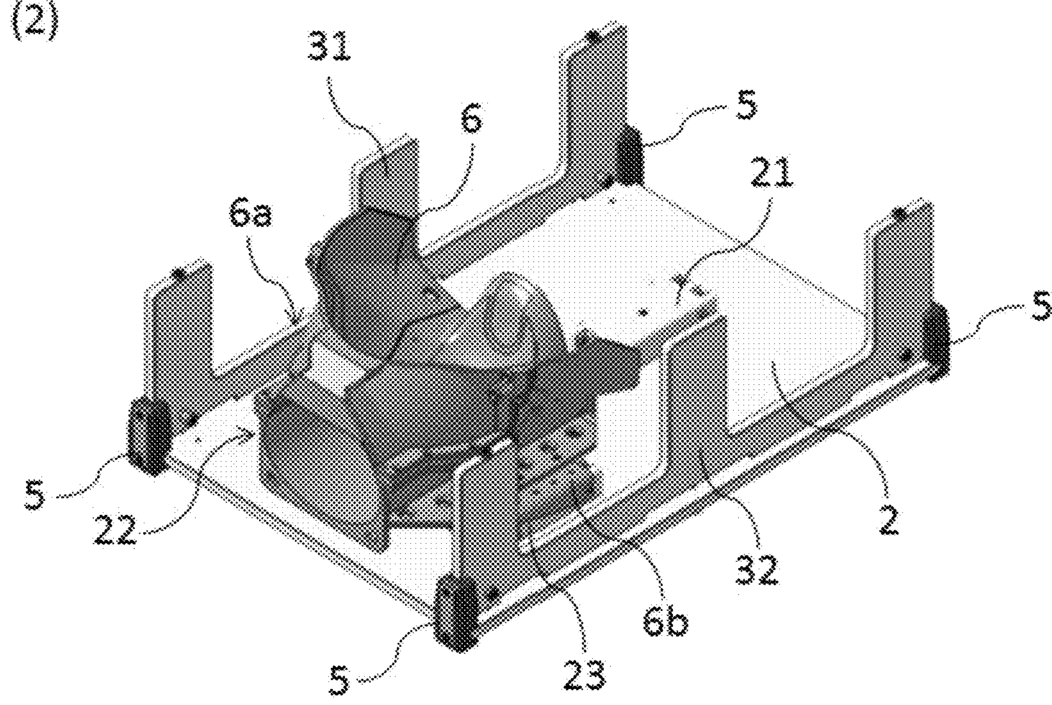
Figure 17:
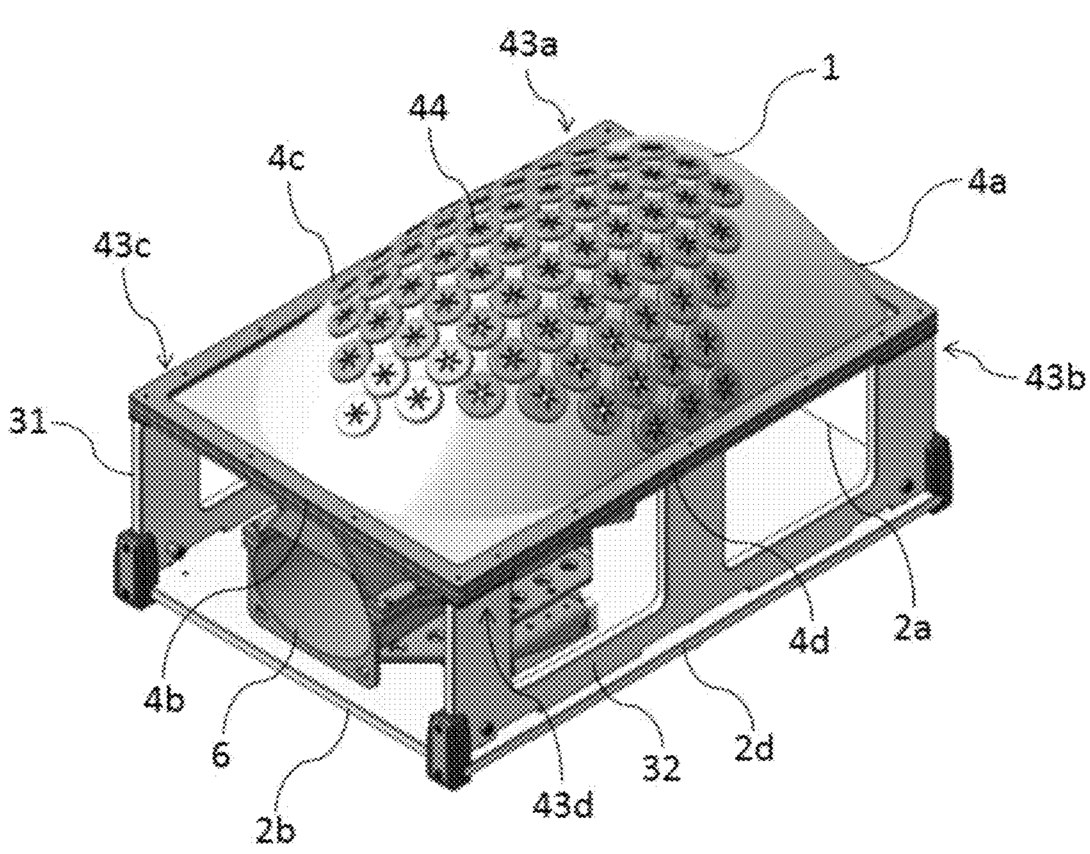
FIG. 17 is an installation image diagram 2 of a uterine model fixture.

FIGS. 16 and 17 are installation images of the uterine model fixture, FIG. 16 (1) is a right side view of the uterine model fixture attached on the pedestal, and FIG. 16 (2) is a perspective view of the uterine model fixture attached on the pedestal. As shown in FIGS. 16 (1) and 16 (2), the uterine model fixture 6 is attached on the pedestal 2. Specifically, a locking portion 6*a* provided on the uterine model fixture 6 is locked to the fixing portion 22, and a locking portion 6*b* is locked and fixed to the fixing portion 23. For example, a metal member (not shown) having a magnetic material may be provided inside the locking portions (6*a*, 6*b*). By providing the locking portions (6*a*, 6*b*) with the metal member having the magnetic material, it is possible to easily hold the fixed state at the time of fixing.

As shown in FIG. 17, a uterine model fixture 6 is attached to the assembled abdominal cavity simulator 1. Among the members constituting the assembled abdominal cavity simulator 1 other than the pneumoperitoneum cover 4, the pedestal 2, the side plate members (31, 32) and the fasteners 5 do not have shapes simulating the human body, but the shapes of these members are not so important in the procedure training. Although not shown here, an organ model is arranged in the uterine model fixture 6, and the organ model and the uterine model fixture 6 can be combined to realistically reproduce the inside of the body cavity.

Therefore, in the assembled abdominal cavity simulator 1, the pneumoperitoneum cover 4 having the port holes 44 into which the forceps or the like is actually inserted is realistically reproduced, and the fixing portions (22, 23) can firmly hold the uterine model fixture 6. By providing this structure, it is possible to perform realistic procedure training that is closer to the actual surgery.

Embodiment 3

Figure 18:
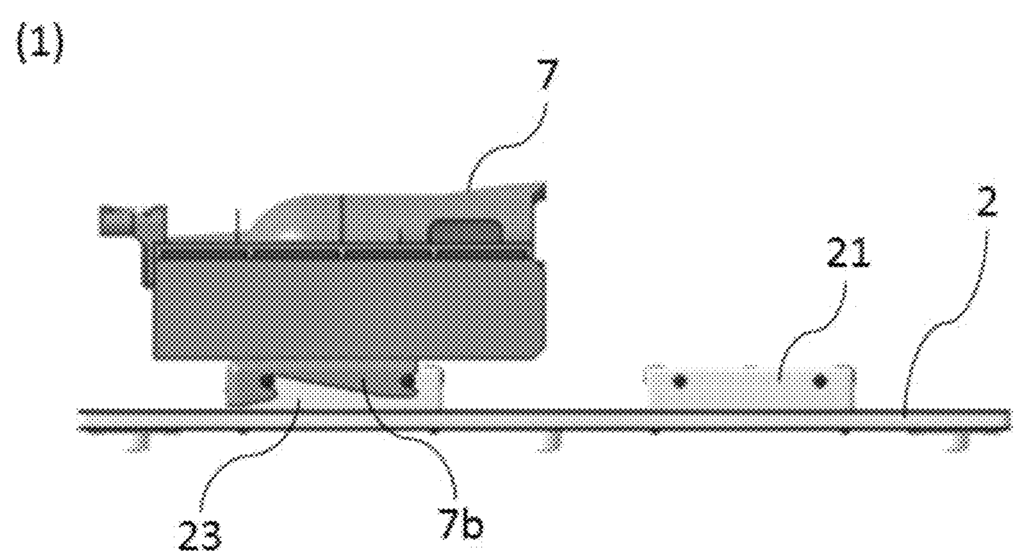
FIG. 18 is an installation image diagram 1 of a gastric model fixture.
Figure 18:
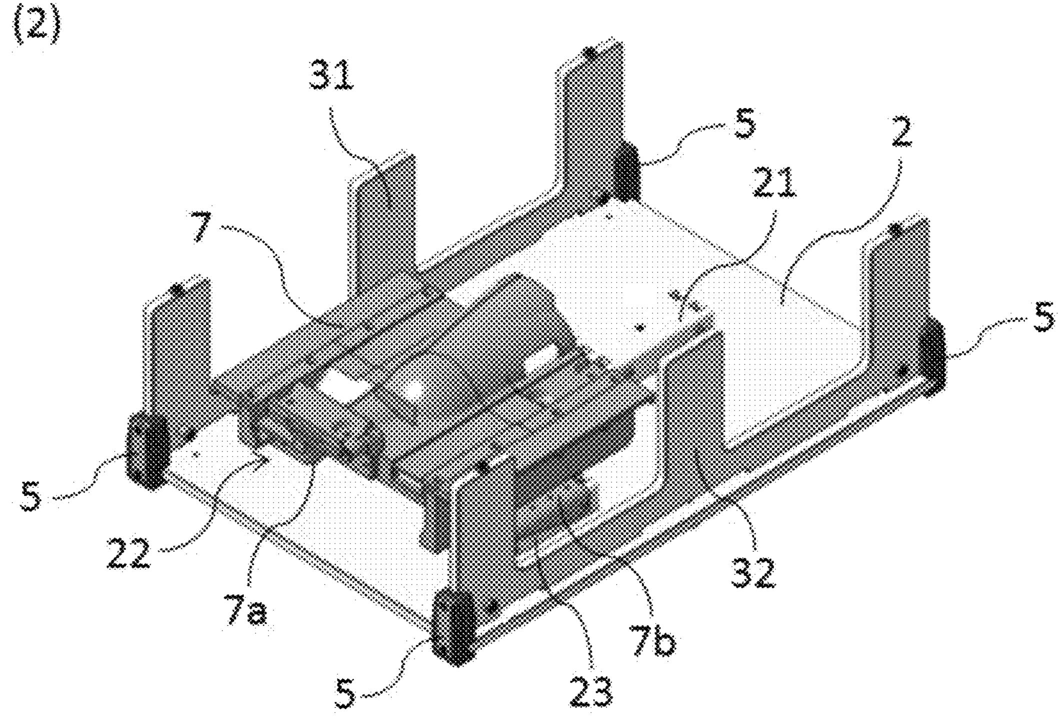
Figure 19:
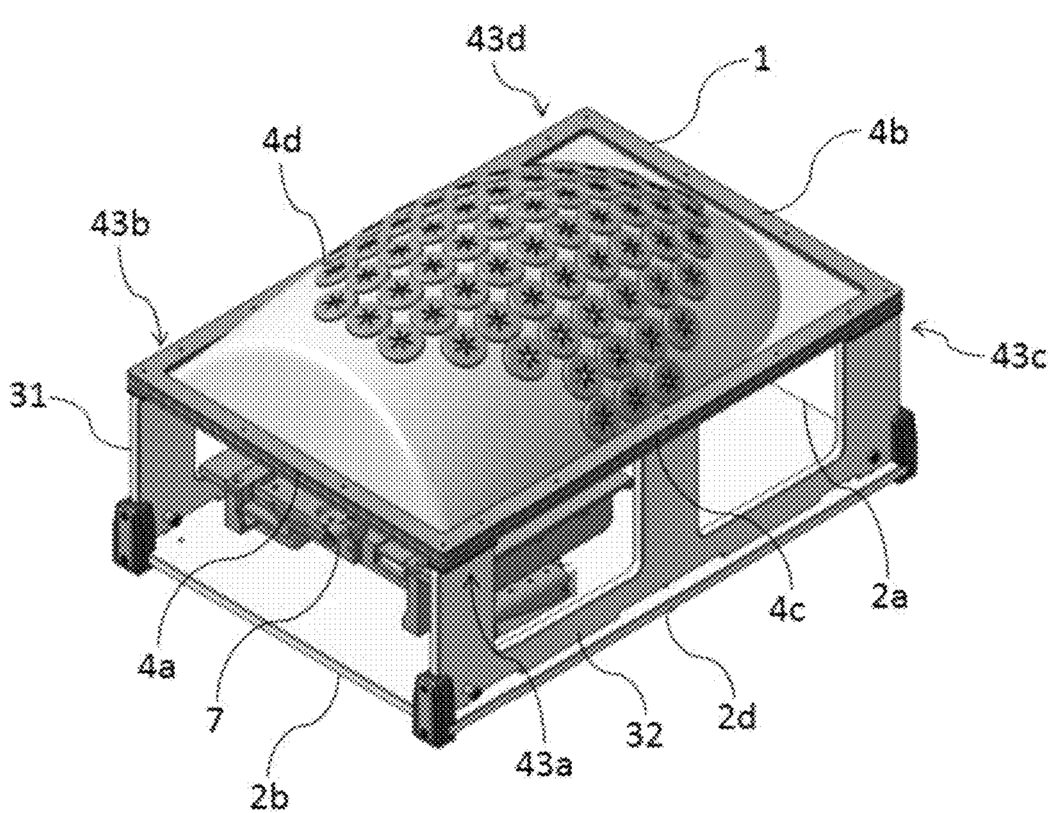
FIG. 19 is an installation image diagram 2 of a gastric model fixture.

FIGS. 18 and 19 are installation images of the gastric model fixture, FIG. 18 (1) is a right side view of the gastric model fixture attached on the pedestal, and FIG. 18 (2) is a perspective view of a gastric model fixture attached on the pedestal. As shown in FIGS. 18 (1) and 18 (2), the gastric model fixture 7 is attached on the pedestal 2. Specifically, the locking portion 7*a* provided on the gastric model fixture 7 is locked to the fixing portion 22, and the locking portion 7*b* is locked to the fixing portion 23 to be fixed.

As shown in FIG. 17, the uterine model fixture 6 described in the second embodiment is attached so that the foot side is the lower end portion 2*b* side of the pedestal 2 and the head side is the upper end portion 2*a* side of the pedestal 2. On the other hand, as shown in FIG. 19, the gastric model fixture 7 of the third embodiment is attached so that the foot side is the upper end portion 2*a* side of the pedestal 2 and the head side is the lower end portion 2*b* side of the pedestal 2. This is because, as shown in FIG. 18 (2), the gastric model fixture 7 has a structure in which the gastric model fixture 7 is attached to the fixing portions (22, 23) of the pedestal 2 using two locking portions (7*a*, 7*b*).

Therefore, in a case in which the gastric model fixture 7 is used in the assembled abdominal cavity simulator 1, it is used by reversing the direction of the pneumoperitoneum cover 4 horizontally by 180° as compared with the case where the uterine model fixture 6 is used. That is, in a case in which the uterine model fixture 6 is used, as shown in FIG. 17, the right end 4*c* of the pneumoperitoneum cover 4 is attached on the side plate member 31 in contact with each other, and the left end portions 4*d* of the pneumoperitoneum cover 4 are attached on the side plate member 32 in contact with each other. On the other hand, if the gastric model fixture 7 is used, as shown in FIG. 19, the left end portion 4*d* of the pneumoperitoneum cover 4 is attached on the side plate member 31 in contact with each other, and the right end portion 4*c* of the pneumoperitoneum cover 4 is attached on the side plate member 32 in contact with each other.

In this way, various patterns of procedure training can be performed by freely adjusting the mounting position on the pedestal 2 and the mounting direction of the pneumoperitoneum cover 4 depending on the number and structure of the locking portions of the organ model fixture to be used.

Other Embodiments

1) The organ model fixture may be attached using all of the fixing portions (21 to 23).
2) It may be configured such that four or more fixing portions are provided on the pedestal 2.

INDUSTRIAL APPLICABILITY

The present invention is useful as a simulator for training and learning endoscopic surgery such as laparoscopic procedures.

DESCRIPTION OF SYMBOLS

1 Assembled abdominal cavity simulator
2 Pedestal
2*a*, 4*a* Upper end portion
2*b*, 4*b* Lower end portion
2*c*, 4*c* Right end portion
2*d*, 4*d* Left end portion
3, 31, 32 Side plate member
4 Pneumoperitoneum cover
5 Fastener
5*a*, 5*b* Groove portion
6 Uterine model fixture
6*a*, 6*b*, 7*a*, 7*b* Locking portion
7 Gastric model fixture
20 Pedestal main body
20*a* Upper portion
20*b* Lower portion
21~23 Fixing portion
21*a*, 22*a*, 23*a* Magnet
24*a*~24*d*, 43*a*~43*d* Recess
25 Non-slip member
33*a*, 33*b* Notch
34*a*~34*d*, 35*a*~35*d* Protrusion
41 Pneumoperitoneum
42 Frame portion
44 Port hole
50 Fastener main body
51 Metal plate
52*a*, 52*b* Screw
P Position

What is claimed is:

1. An abdominal cavity simulator for laparoscopic procedure training, comprising:

a pedestal that is provided with multiple fixing portions configured to mount an organ model fixture, a first fitting portion being provided in the pedestal;

a casing configured to simulate a pneumoperitoneum, a second fitting portion being provided in the casing; and wherein the pedestal and the casing are configured to be secured to each other by fitting together the first fitting portion and the second fitting portion in a first state, and the pedestal and the casing are also configured to be secured to each other by fitting together the first fitting portion and the second fitting portion in a second state which differs from the first state in that a direction of either the pedestal or the casing has been changed by 180°; and wherein an odd number of fixing portions is provided on one side along a longitudinal direction of the pedestal and an even number of fixing portions is provided on the other side along the longitudinal direction of the pedestal, one of the odd number of fixing portions is provided in the center of the pedestal in a lateral direction, and the even number of fixing portions is provided so as to straddle the center of the pedestal in the lateral direction.

2. The abdominal cavity simulator according to claim 1, wherein the casing includes:

a pneumoperitoneum cover configured to simulate the pneumoperitoneum, a first recess set being provided in the pneumoperitoneum cover;

two side plate members which are configurable to provide a space between the pneumoperitoneum cover and the pedestal for allowing the organ model fixture to be arranged therein, a first protrusion set and a second protrusion set being provided in each of the side plate members;

wherein a second recess set is provided in the pedestal, the second recess set and the second protrusion set corresponding to the first fitting portion and the second fitting portion respectively;

wherein the pneumoperitoneum cover and the side plate members are configured to be secured to each other by fitting the first recess set and the first protrusion set; and wherein the pedestal and the side plate members can be secured to each other by fitting the second recess set and the second protrusion set in the first state, and in the second state the pneumoperitoneum cover and the side plate members can be secured to each other by fitting the first recess set and the first protrusion set, and the pedestal and the side plate members can be secured to each other by fitting the second recess set and the second protrusion set.

3. The abdominal cavity simulator according to claim 2, further comprising a fastener having a T-shaped groove, the fastener configured to reinforce a fixed state of the pedestal and one of the side plate members when the second recess set of the pedestal and the second protrusion set of the side plate member are fitted to fix the pedestal and the side plate member.

4. The abdominal cavity simulator according to claim 3, wherein the fixing portion is provided with a magnet, and wherein the fastener is provided with a metal member having a magnetic material, and the metal member is configured to be fixed to the magnet and stored.

5. The abdominal cavity simulator according to claim 4, wherein each side plate member is formed with a notch at a position that permits the side plate member to lay on the pedestal without interference from the portion or the metal member fixed to the magnet.

6. The abdominal cavity simulator according to claim 1, wherein the fixing portions include one fixing portion on one side and two fixing portions on the other side in a longitudinal direction of the pedestal from a center of the pedestal, and the one fixing portion is provided at the center of the pedestal in a lateral direction and the two fixing portions are provided so as to straddle the center of the pedestal in the lateral direction.

7. An abdominal cavity simulator for laparoscopic procedure training, comprising:

a pedestal that is provided with multiple fixing portions configured to mount an organ model fixture, a first fitting portion being provided in the pedestal;

a casing configured to simulate a pneumoperitoneum, a second fitting portion being provided in the casing; and wherein the pedestal and the casing are configured to be secured to each other by fitting together the first fitting portion and the second fitting portion in a first state, and the pedestal and the casing are also configured to be secured to each other by fitting together the first fitting portion and the second fitting portion in a second state which differs from the first state in that a direction of either the pedestal or the casing has been changed by 180°; and wherein the casing includes:

a pneumoperitoneum cover configured to simulate the pneumoperitoneum, a first recess set being provided in the pneumoperitoneum cover;

two side plate members which are configurable to provide a space between the pneumoperitoneum cover and the pedestal for allowing the organ model fixture to be arranged therein, a first protrusion set and a second protrusion set being provided in each of the side plate members;

wherein a second recess set is provided in the pedestal, the second recess set and the second protrusion set corresponding to the first fitting portion and the second fitting portion respectively;

wherein the pneumoperitoneum cover and the side plate members are configured to be secured to each other by fitting the first recess set and the first protrusion set; and wherein the pedestal and the side plate members can be secured to each other by fitting the second recess set and the second protrusion set in the first state, and in the second state the pneumoperitoneum cover and the side plate members can be secured to each other by fitting the first recess set and the first protrusion set, and the pedestal and the side plate members can be secured to each other by fitting the second recess set and the second protrusion set.

8. The abdominal cavity simulator according to claim 7, wherein each side plate member is provided with a third protrusion set and a fourth protrusion set, and wherein each side plate member is configured to be layered and fixed on the pedestal by fitting the second recess set of the pedestal and the fourth protrusion set, and wherein the pneumoperitoneum cover is configured to be layered and fixed on each side plate member by fitting the first recess set of the pneumoperitoneum cover and the third protrusion set.

9. The abdominal cavity simulator according to claim 8, further comprising a fastener having a T-shaped groove, the fastener configured to reinforce a fixed state of the pedestal and one of the side plate members when the second recess set of the pedestal and the second protrusion set of the side plate member are fitted to fix the pedestal and the side plate member.

10. The abdominal cavity simulator according to claim 9, wherein the fixing portion is provided with a magnet, and wherein the fastener is provided with a metal member having a magnetic material, and the metal member is configured to be fixed to the magnet and stored.

11. The abdominal cavity simulator according to claim 10, wherein each side plate member is formed with a notch at a position that permits the side plate member to lay on the pedestal without interference from the portion or the metal member fixed to the magnet.

12. The abdominal cavity simulator according to claim 7, wherein the fixing portions include one fixing portion on one side and two fixing portions on the other side in a longitudinal direction of the pedestal from a center of the pedestal, and the one fixing portion is provided at the center of the pedestal in a lateral direction and the two fixing portions are provided so as to straddle the center of the pedestal in the lateral direction.

13. The abdominal cavity simulator according to claim 7, wherein an odd number of fixing portions is provided on one side along a longitudinal direction of the pedestal and an even number of fixing portions is provided on the other side along the longitudinal direction of the pedestal, one of the odd number of fixing portions is provided in the center of the pedestal in a lateral direction, and the even number of fixing portions is provided so as to straddle the center of the pedestal in the lateral direction.

14. The abdominal cavity simulator according to claim 7, wherein the fixing portions include one fixing portion on one side and two fixing portions on the other side in a longitudinal direction of the pedestal from a center of the pedestal, and the one fixing portion is provided at the center of the pedestal in a lateral direction and the two fixing portions are provided so as to straddle the center of the pedestal in the lateral direction.

15. An abdominal cavity simulator for laparoscopic procedure training, comprising:

a pedestal that is provided with multiple fixing portions configured to mount an organ model fixture, a first fitting portion being provided in the pedestal;

a casing configured to simulate a pneumoperitoneum, a second fitting portion being provided in the casing; and wherein the pedestal and the casing are configured to be secured to each other by fitting together the first fitting portion and the second fitting portion in a first state, and the pedestal and the casing are also configured to be secured to each other by fitting together the first fitting portion and the second fitting portion in a second state which differs from the first state in that a direction of either the pedestal or the casing has been changed by 180°; and wherein the fixing portions include one fixing portion on one side and two fixing portions on the other side in a longitudinal direction of the pedestal from a center of the pedestal, and the one fixing portion is provided at the center of the pedestal in a lateral direction and the two fixing portions are provided so as to straddle the center of the pedestal in the lateral direction.

16. The abdominal cavity simulator according to claim 15, wherein an odd number of fixing portions is provided on one side along a longitudinal direction of the pedestal and an even number of fixing portions is provided on the other side along the longitudinal direction of the pedestal.

17. The abdominal cavity simulator according to claim 15, wherein the casing includes a pneumoperitoneum cover configured to simulate the pneumoperitoneum, a first recess set being provided in the pneumoperitoneum cover.

18. The abdominal cavity simulator according to claim 17, wherein the casing includes two side plate members which are configurable to provide a space between the pneumoperitoneum cover and the pedestal for allowing the organ model fixture to be arranged therein.

* * * * *